Patented July 22, 1924.

1,502,260

UNITED STATES PATENT OFFICE.

OWEN DAVID LUCAS, OF WESTMINSTER, LONDON, ENGLAND, ASSIGNOR TO V. L. OIL PROCESSES, LIMITED, OF WESTMINSTER, LONDON, ENGLAND.

PREPARATION OF CATALYTIC BODIES.

No Drawing. Application filed October 23, 1923. Serial No. 670,240.

*To all whom it may concern:*

Be it known that I, OWEN DAVID LUCAS, a subject of the King of Great Britain, residing at Vickers House, Broadway, Westminster, in the county of London, England, have invented certain new and useful Improvements in or Relating to the Preparation of Catalytic Bodies, of which the following is a specification.

This invention relates to an improved process for the manufacture of catalytic bodies in the form of blocks or briquettes, which while coherent are porous so as to allow the reacting materials to penetrate.

The catalytic body to which this invention relates is prepared by the reduction of a mixture comprising a metallic oxide and an organic metal compound which on heating evolves carbon monoxide or carbon dioxide, the reduction being effected, if necessary, by a reducing agent. The organic metal compound may be an oxalate, tartrate, acetate or carbonate which evolves carbon monoxide or carbon dioxide on heating and the mixture is briquetted by a suitable binding agent which itself may form the whole or part of the reducing agent. According to the present invention the catalytic body is manufactured in two distinct stages, in the first of which partial reduction is effected by the aid of a carbonaceous reducing agent, whereupon the partially reduced material is ground, mixed with a second portion of reducing agent and heated to a higher temperature than in the first stage, so as to sinter the reduced metal.

For the first stage of the process the ground oxide or oxides and the organic metal compound or compounds are mixed with a carbonaceous reducing agent, such as tar, amounting to about 10 per cent of the total mass together with about 1 per cent of ground carbon, and this mixture, preferably briquetted, is heated to a temperature of about 700° to 800° C. until all the carbon monoxide and dioxide have been evolved from the organic metal compound or compounds employed, the heating, however, being stopped before the carbon or carbonaceous reducing agent has reacted with the oxides or sub-oxides produced during the heating stage. The resulting material is coarsely reground and is then mixed with a second supply of carbonaceous reducing and binding agent, which may again consist of about 10 per cent of tar and about 1 per cent of ground carbon, the mixture being then rebriquetted and roasted in a suitable furnace to a temperature of about 1000 to 1100° C., with the result that the oxides are reduced to the metallic condition, while the temperature is kept below the melting point of the metals employed but is sufficient to cause sintering so as to produce a porous mass which forms a very active catalyst.

In some cases it may be desirable to omit the addition of ground carbon and employ the tar or equivalent carbonaceous reducing and binding agent only. It is found that the mass obtained at the end of the first stage is very friable and is readily reground, while the sintered mass of the final briquette possesses substantial strength, but is porous throughout.

The metallic oxides and organic compounds employed vary according to the nature of the chemical reaction for which the catalyst is intended, but those which are suitable for many types of catalyst comprise the compounds of iron, nickel, cobalt, manganese and other heavy metals. As specific examples of mixtures which are suitable for a variety of purposes the following may be taken:—

|  | Parts. |
|---|---|
| Ferric oxide | 34 |
| Nickel oxide | 8 |
| Ferrous oxalate | 42 |
| Nickel oxalate | 16 |
|  | 100 |

| | |
|---|---|
| Red oxide or iron | 36 |
| Manganese carbonate | 28 |
| Aluminium | 5 |
| Ferrous oxalate | 31 |
|  | 100 |

| | |
|---|---|
| Ferric oxide | 36 |
| Nickel oxide | 15 |
| Aluminium | 3 |
| Iron tartrate | 30 |
| Nickel acetate | 16 |
|  | 100 |

Any one of the above mixtures, or equivalent mixtures, may be treated in the manner above described by heating and reducing in two stages, adding at the first stage the proportion of carbonaceous reducing agent which will effect the partial reduction desired, but not the complete reduction to metals of the oxides and organic metal compounds employed, while complete reduction to the desired porous mass is effected at the second stage by the addition of the second quantity of reducing agent and by heating to a higher temperature. As will be seen from two of the examples, a small proportion of aluminium may be employed and it is sometimes desirable to add small quantities of a reducing metal, such as aluminium, magnesium or the like, to facilitate the reduction of the oxides.

What I claim and desire to secure by Letters Patent of the United States is:—

1. A process for the production of a catalytic body of the kind set forth, by reduction of a mixture of a metallic oxide and an organic metal compound, which consists in manufacturing the catalytic body in two distinct stages, in the first of which partial reduction of the metallic oxide is effected by the aid of a carbonaceous reducing agent mixed therewith, whereupon the partially reduced material is ground, mixed with a second portion of reducing agent and heated in the second stage to a higher temperature than in the first stage, so as to sinter but not to melt the reduced metal.

2. A process for the production of a catalytic body which consists in mixing ground oxide and an organic metal compound with a carbonaceous reducing and binding agent, heating the mixture to a temperature at which the carbon monoxide and dioxide are driven off from the organic metal compound, coarsely grinding the resulting material and then mixing it with a second supply of the carbonaceous reducing and binding agent sufficient to effect substantially complete reduction of the oxide and then heating the mixture to a considerably higher temperature than in the first stage but below the melting point of the metal employed, whereby the oxide is reduced to the metallic condition and sintering is effected to produce a porous mass.

3. A process for the production of a catalytic body as in claim 2, in which the carbonaceous reducing agent in each of the stages mentioned amounts to approximately 10 per cent of the total mass, with a small proportion, of the order of 1 per cent, of carbon.

4. A process for the production of a catalytic body as in claim 1, in which the heating during the first stage is carried to a temperature of about 700° to 800° C., and in the second stage is carried to a temperature of about 1000° to 1100° C.

5. A process for the production of a catalytic body which consists in mixing ground mixed oxides and an organic metal compound with a carbonaceous reducing and binding agent, heating the mixture to a temperature at which the carbon monoxide and dioxide are driven off from the organic metal compound, coarsely grinding the resulting material and then mixing it with a second supply of the carbonaceous reducing and binding agent sufficient to effect substantially complete reduction of the mixed oxides and then heating the mixture to a considerably higher temperature than in the first stage but below the melting point of the metals employed, whereby the mixed oxides are reduced to the metallic condition and sintering is effected to produce a porous mass.

6. A process for the production of a catalytic body as in claim 2, in which the carbonaceous reducing agent in each of the stages mentioned amounts to approximately 10% of the total mass.

OWEN DAVID LUCAS.